United States Patent
Garland et al.

[19]

[11] Patent Number: 5,825,849
[45] Date of Patent: Oct. 20, 1998

[54] LOOP-BACK TEST SYSTEM USING A SUPPRESSED RINGING CONNECTION

[75] Inventors: Stuart Mandel Garland, Morton Grove; David B. Smith, Hinsdale, both of Ill.

[73] Assignee: Lucent Technologies, Inc., Murray Hill, N.J.

[21] Appl. No.: 522,215

[22] Filed: Aug. 31, 1995

[51] Int. Cl.⁶ .............................. H04M 1/24; H04M 3/08; H04M 3/22

[52] U.S. Cl. .................................. 379/5; 379/1; 379/27; 379/29; 379/32; 379/106.09; 379/106.11

[58] Field of Search ................... 379/2, 5, 9–10, 379/12, 26–29, 1, 22, 25, 32, 15, 6, 23, 31, 102.01, 102.07, 106.03, 106.05, 106.07, 106.09, 106.11

[56] References Cited

U.S. PATENT DOCUMENTS

| | | | |
|---|---|---|---|
| 3,800,090 | 3/1974 | Matena | 379/106.11 |
| 3,899,639 | 8/1975 | Cleveley et al. | 379/106.08 |
| 4,002,837 | 1/1977 | Ebner et al. | 379/106.08 |
| 4,394,540 | 7/1983 | Willis et al. | 379/106.08 |
| 4,815,119 | 3/1989 | Mills | 379/29 |
| 4,995,109 | 2/1991 | Arizumi et al. | 379/106.08 |
| 5,063,585 | 11/1991 | Shapiro | 379/30 |
| 5,363,431 | 11/1994 | Schull et al. | 379/67 |
| 5,521,964 | 5/1996 | Schull et al. | 379/67 |
| 5,528,661 | 6/1996 | Siu et al. | 379/27 |
| 5,535,267 | 7/1996 | Schull | 379/27 |

OTHER PUBLICATIONS

Schlumberger, Bulletin 15002, "MAPS™ Series, TO–1002 Telephone Outbound Meter Interface Unit," effective May 1995, 2 pp.

*Primary Examiner*—Curtis A. Kuntz
*Assistant Examiner*—Binh K. Tieu

[57] ABSTRACT

The test system of the invention uses suppressed ringing connections from a test unit to the customer premise equipment via the central office to establish connections for performing the loop-back test. The suppressed ringing connections are established over standard voice trunks between a switch in the central office and the test unit by a central office service unit (COSU) such that the number of lines that can be tested simultaneously is limited only by the number of trunks linking the COSU to a switch. Because these trunks are relatively inexpensive and simple to install and maintain, the test system of the invention can be readily installed and expanded in the existing network to provide virtually any level of monitoring capability.

27 Claims, 3 Drawing Sheets ial 5,825,849

LOOP-BACK TEST SYSTEM USING A SUPPRESSED RINGING CONNECTION

BACKGROUND OF THE INVENTION

The invention relates, generally, to the testing of local loops in a public switched telecommunications network and, more particularly, to a system for using a telemetry connection having suppressed ringing capability to provide a simple and inexpensive mechanism for conducting loop-back tests on either the analog or ISDN local loops.

It will be appreciated that a public switched telecommunications network generally consists of a plurality of switching systems in communication with one another where some of those switching systems, so called central offices, are connected to customer premise equipment over local loops such that customers can communicate with one another over the network. It is to be understood that the local loop is normally the two-wire line drop and equipment disposed along the line drop, such as loop carriers and interface devices, that connects the central office to customer premise equipment (CPE) such as telephones, utility meters, appliances, terminals, multimedia equipment or the like. The network administrator must efficiently service and maintain the network in order to provide reliable, high quality service to its customers. Currently, most central offices utilize test facilities for testing the electrical characteristics of the local loop where the test facility is either integrated into the central office or can access the central office remotely.

One such loop test facility is the mechanized loop test system (MLT) manufactured and sold by AT&T. The MLT is a testing facility that is accessed by a plurality of central offices such that tests of the electrical characteristics of the loops connected to those offices can be performed. A typical arrangement of the MLT includes a loop test subsystem located in each central office. The loop test subsystem provides access to customer lines only over specially engineered test trunks within the central office and each of these trunks is capable of testing only one line at a time. Front end processors are connected to the loop test subsystems over a data communication network such that the front end processors can control the loop test subsystems remotely. The front end processors communicate with a central computer that coordinates the activities of the front end processors and provides general administration and provisioning for the system.

Typically, the test subsystem delivers a voltage or current to the two-wire line drop and measures a resultant current or voltage across the drop. Each loop test subsystem includes a controller that receives messages from the front end processor, divides the messages into tasks to be performed and instructs the other parts of the loop test subsystem to perform these tasks. The MLT returns a code that identifies problem areas in the local loop that are used by automated systems to determine repair activities.

Such facilities, while providing sophisticated test capabilities, are relatively expensive such that these test facilities are engineered to the level of reactive maintenance. In other words, existing loop test facilities are typically used to identify the source of problems in the local loop only after a customer report of a service interruption or after a problem in the local loop is identified by some other automated test such as the automatic line insulation test (ALIT). These test systems require a metallic bypass network to connect the test system to the local loop and do not utilize the normal call processing switch fabric. It will be appreciated that these loop test facilities typically include only two test trunks, one of which is typically dedicated to use by craft in the field during their repair and maintenance activities. Thus, only one test trunk is usually available per central office for the reactive testing of the local loops. Because the test trunks are designed into the central offices and the inclusion of the test trunks in the switching system utilizes valuable switch resources, it is undesirable to add additional test trunks in the switch. As a result, the throughput of the existing system (i.e. the number of tests that can be run per unit time) is limited. A typical central office hosts thousands of local loops but existing test facilities that rely on internal test trunks are effectively limited to the testing of loops only in response to a customer report or in response to another test procedure such as ALIT and continuous testing for preventative maintenance is not economically feasible.

As explained above, test systems such as ALIT have been developed to perform some proactive maintenance. The ALIT, however, is disruptive to normal service and can only be used during times of very low use, such as at night. Thus, these systems do not provide continuous diagnostic coverage. Moreover, ALIT, like the MLT, has a relatively low throughput due to its resource intensive nature and the fact that it is not connected through the normal call processing switch fabric.

While existing testing facilities are very good at responding to and identifying the source of reported service interruptions, many service providers desire a more proactive maintenance system in which problems and potential problems are identified by the service provider before they result in service interruptions reported by the customer. In order to provide effective proactive maintenance, the line tests must be repeated often enough to detect a high percentage of problems before those problems manifest themselves to the customer. Realistically, such testing must be performed on a near continuous basis to provide a relatively high degree of success in identifying problems. Such continuous testing is possible only if the test method is relatively inexpensive to install and operate and will not disrupt customer service. Unfortunately, the existing test facilities are too limited by design, too resource intensive to expand and disruptive to service to provide continuous testing.

Finally, it is known to provide loop-back tests in computer networks where two or more computers are in communication with one another such as in a local area network or through a switched network. Typically, modems in the network are provided with loop-back devices that allow a predetermined signal, sent from one computer in the network to a modem, to be sent back to the sending computer (i.e., "looped-back") such that the sending computer can determine if the modem is properly receiving and processing the signals. The modems that provide loop-back testing do not typically exist in other equipment at the customer location. While such loop-back devices are known in the computer networking art, there does not exist an equivalent system for providing such loop-back test systems in a public switched telecommunications network for either continuity or service level testing for other than computer to computer testing.

Thus, there exists a problem in the art in that no simple, inexpensive loop-back test system exists for providing continuous monitoring of a local loop in a public switched telecommunications network.

SUMMARY OF THE INVENTION

The test system of the invention uses a suppressed ringing connection switched through the existing call processing switch fabric in the central office from a test unit to an identified local loop to establish the connection for performing loop-back tests. A plurality of loop-back devices are provided in the local loop to return a response signal to the test unit upon receipt of a loop-back test signal from the testing unit. The test unit compares the actual response signal to a predetermined expected signal to determine if the test message was transmitted to the loop-back device and if response signal was returned without error. It will be appreciated that suppressed ringing connections are established over standard voice trunks connecting the central office and a central office service unit (COSU) so that the number of local loops that can be tested simultaneously depends on the number of standard trunks linking the COSU to the switch (es). Because these trunks are relatively inexpensive and simple to install and maintain, the test system of the invention can be readily installed and expanded in the existing network to provide virtually any level of monitoring capability. Moreover, the suppressed ringing connection is terminated whenever an outgoing call is initiated from the customer premise. As a result, the loop-back test using suppressed ringing connections can be performed at any time without interrupting the customer's outgoing service. An improved method of addressing devices using the suppressed ringing connection is also disclosed with specific application to the test system of the invention.

DETAILED DESCRIPTION

Figure 1:
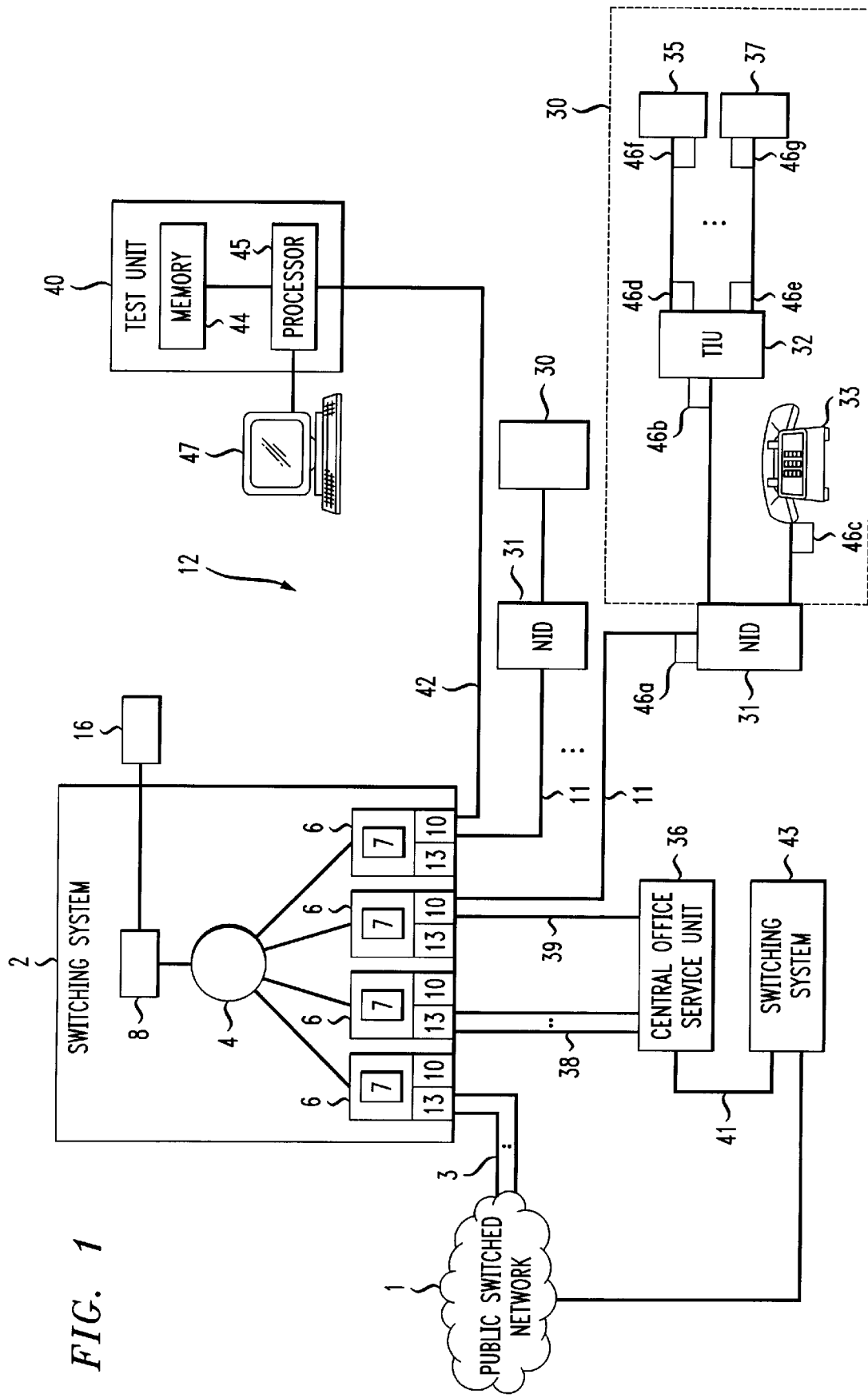
FIG. 1 is a block diagram showing the loop-back test system of the invention.

The loop-back test system of the invention can be used in a public switched telecommunications network illustrated in FIG. 1 and consists of a central office switching system 2 connected to other switches in the public switched network 1 over inter-office trunks 3 as is well understood. Switching system 2 can consist of one of the family of 5ESS® switches manufactured and sold by AT&T and described in U.S. Pat. No. 4,592,048 issued to Beckner et al. on May 27, 1986 and in *AT&T Technical Journal*, Vol. 64, No. 6, Part 2, pp. 1305–1524, or any other similar switching system. Switching system 2 operates as is well known in the art to switch voice and data through the network. The architecture of such a switching system is shown and includes a communication module 4 forming a hub and having a plurality of switch modules 6, and an administration module 8 emanating therefrom. Each switch module 6 is controlled by microprocessor 7 and provides call processing, time division switching, and signaling for the lines and trunks to which it is connected. Line units 10 provide interface to the local loops 12 that connect to the customer premise equipment and trunk units 13 provide interface to the trunks 3 that connect to other switches in the network as well as to the utility telemetry trunks (UTT) 38, as will hereinafter be described. The administration module 8 provides functions that can be centralized such as maintenance control, craft interface, text and data base management, call routing and time slot allocation. The administration module 8 consists of a control unit such as the AT&T 3B21D duplex processor and a main memory. In some switching systems, the administration module is assisted by a separate processor that performs some administrative functions. The administration module 8 also includes an input/output processor providing communication between the switching system 2 and central office peripheral devices 16 such as terminals, printers and the like. Communication module 4 is the hub of the switching system and allows communication between the administration module 8 and the switch modules 6. Communication module 4 consists of a message switch that provides the administration module-to-switch module and switch module-to-switch module message communication, and a time multiplexed switch providing the switch module-to-switch module and switch module-to-administration module time slot connection for voice and data communication and the clock distribution.

The local loops 12 typically consisting of a pair of copper wires, coaxial cables, fiber or any similar transmission medium defining local lines 11 that connect switch 2 to customer premise equipment (CPE) 30 such as telephones, utility meters, appliances, multimedia equipment, terminals or the like. One arrangement of the local loop is illustrated where the wire pair is terminated at a network termination device 31, the network termination device 31 being connected in parallel to a telephone set 33 over a first wire pair and to a telemetry interface unit (TIU) 32 over a second wire pair. The TIU 32 includes circuitry for selectively connecting local lines 11 to a desired one of a plurality of CPEs such as meters 35, appliance controllers 37 or the like and for controlling the functions of the TIU and can consist of T0-1002 meter interface unit (MIU) manufactured and sold by Schlumberger Industries or other similar device. Alternatively, the telephone set 33 could be arranged in series with TIU 32, meters 35 and/or appliance controllers 37, if desired. A plurality of loop-back devices 46a through 46g are provided along the local loop for returning a response signal as will hereinafter be described. The local loops may also include loop carrier systems such as the SLC® carrier manufactured and sold by AT&T.

A central office service unit (COSU) 36 is connected to the switch 2 over one or more utility telemetry trunks (UTT) 38 and by a dial up or dedicated line 39. A test unit 40 is also connected to the switching system 2 over a dedicated or dial up line 42. As will be appreciated line 42 can be connected to line 39 through the switch fabric of switching system 2 in the same manner as voice and data connections to allow test unit 40 to communicate with COSU 36. As explained in detail in U.S. Pat. No. 5,189,694 issued to Garland on Feb. 23, 1993; U.S. Pat. No. 5,243,644 issued to Garland et al. on Sep. 7, 1993; U.S. Pat. No. 5,394,461 issued to Garland on Feb. 28, 1995; and U.S. Pat. No. 5,327,488 issued to Garland on Jul. 5, 1994, COSU 36 and UTT 38 are used to establish a suppressed ringing connection between, for example, a utility and a utility meter located in the home to allow the utility to determine service usage by a customer.

The test system of the invention uses the suppressed ringing connection to connect the test unit 40 and any CPE hosted by switching system 2 such that the test unit and CPE communicate with one another without a visual or audible signal being displayed at the customer premise. While such a connection has previously been used, for example, to allow a utility to read a meter at a customer premise from a remote location without producing a ringing alert at the customer premise, it has not been used for testing the local loop and/or subscriber loops or lines. It will be appreciated that the illustrated system allows access to the CPEs without interfering with the customer's ability to make outgoing calls because the suppressed ringing connection established by the COSU is automatically terminated if the customer makes a request for service such as by going off hook.

It also will be appreciated that COSU 36 can be connected to more than one switching system as illustrated in FIG. 1 where UTT 41 connects COSU 36 to a second switching system 43. As a result, a single test unit 40 can perform loop-back tests on local loops hosted by different switching systems.

COSU 36, as is known, creates a many to one connection in which line 39 (which is switch connected to line 42) can be connected to a plurality of UTTs 38. In this manner, the COSU serves to multiplex and demultiplex the signals as they are transmitted between line 39 and UTTs 38 that, in turn, are connected to local lines 11. The number of connections that can be made at one time is determined by the number and type of UIT trunks connecting the COSU 36 to switching system 2. The UTTs 38 can consist of analog trunks where each trunk handles a single call or digital trunks where currently each trunk handles 24 calls. Regardless of the type of trunk used, the existing COSU 36 design is capable of processing 100–150 calls every six seconds and more than one COSU can be associated with each switching system, if desired. As a result, test unit 40 can communicate with a plurality of local loops simultaneously. This capability allows the test system of the invention to provide near continuous monitoring of the local loops such that preventative diagnostics and maintenance can be performed.

To perform the test method of the invention, the test unit 40 includes a processor 45 and memory 44 for running a test program that cycles through a loop-back test protocol. The test system can be operated by a telecommunication service provider such as a local exchange carrier as part of its operation services system, by an independent testing service or it can be located in the premise of a utility or other entity such that the utility can test their CPEs, such as meters, independent from the service provider. Where the test system is operated by a utility or other entity it is desirable to include security safeguards to prevent the utility from accessing equipment other than its own.

The test protocol requires that processor 45 transmit loop-back test signals to loop-back devices located in the local loop 12. In the preferred embodiment, the loop-back test signals consist of tones or a preamble control and a data message. The preamble control contains an indicator such as a subaddress that identifies the specific one of the loop-back devices 46a through 46g targeted to receive the data message by pyocessor 45. The data message includes a predetermined string of characters or signals. The targeted loop-back device receives the data message and identifies it as a loop-back test signal. Upon receipt of the test signal, the loop-back device returns the data message as a response signal to processor 45. Alternatively, the loop-back devices 46a through 46g could modify the test message before looping back the response message such as by encoding or otherwise reconfiguring the message. In an alternate embodiment, loop-back devices 46a through 46g could be replaced by transponders or other devices where the targeted transponder, rather than looping back the originally transmitted data message, would transmit a different, fixed data stream to the processor 45 as the response signal where the data stream is known to the processor 45. The data stream can include a predetermined message, an identification field, error codes or the like. The response signal returned to processor 45 is compared to a desired response signal. If the response message does not correspond to the desired message, processor 45 recognizes an error condition (bit rate errors, message errors or the like) and displays a message at terminal 47 or otherwise informs a craft of the error or automatically initiates a maintenance response. In response to the error message, maintenance is provided to the identified problem area.

Figure 3:
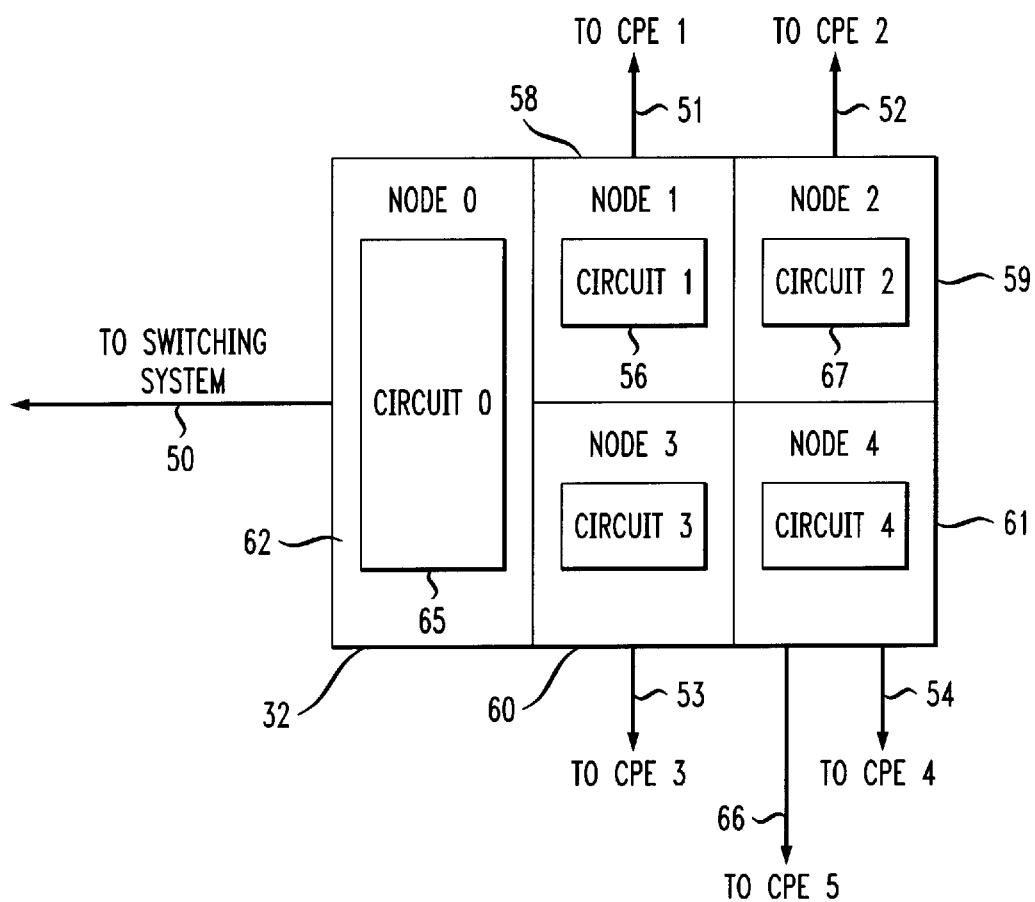
FIG. 3 is a block diagram showing an alternate arrangement of the loop-back devices in the test system of the invention.

One implementation of the loop-back devices and a unique addressing mechanism will be described with reference to FIG. 3. A generalized TIU 32 or network gateway device for interfacing between the network and the CPE is shown having a first port 50 connected to a switching system as previously described with reference to FIG. 1. TTU 32 further includes four ports 51, 52, 53 and 54 for connection to four or more CPEs. In this embodiment, a loop-back device consisting of loop-back circuitry 56 is located in node 58 of TIU 32 where node 58 can include additional circuitry for controlling and monitoring the CPEs connected to port 51. TIU 32 includes other nodes 59, 60, 61, and 62 each including circuitry for controlling other functions of the TIU and the suppressed ringing connection. For example, node 59 is associated with port 52 and includes circuitry 63 for controlling a second CPE, such as a utility meter, connected to port 52. Nodes 60 and 61 are associated with ports 53 and 54 in the same manner. Moreover, node 62 is not related to a specific port but includes circuitry 65 for controlling functions common to the entire TIU or system wide functions. It will be appreciated that each node could support more than one port where each port is connected to a different CPE, if desired, as shown at 66 in FIG. 3.

It will be understood that in existing suppressed ringing systems the COSU is capable of providing fourteen different tones where the different tones are used to alert different TIUs. It is to be understood that tone as used in this application includes single frequency tones, dual frequency tones or other unique tones. Subaddressing is used in the suppressed ringing signal to alert specific CPEs hosted by a common TIU. The improved addressing system of the invention uses the different tones generated by the COSU to alert specific nodes, or circuitry within nodes, in a single TIU, a function not present in existing systems. For example, in the embodiment of FIG. 3, a first tone $f_1$ generated by the COSU 36 (FIG. 1) is used to alert the circuitry 56 of node 58 that a data message is to be transmitted to it. The data message causes a loop-back test to be conducted in accordance with the present invention and returns a response signal to the test unit 40 (FIG. 1), as previously described. Other data messages can be used to cause circuitry 56 to perform other functions. A different tone $f_2$ is used, for example, to alert control circuitry 63 associated with port 52. Additional tones could be used to alert other circuitry in the TIU as will be understood from the foregoing description.

Alternatively, the different tones, $f_1, f_2 \ldots fn$ could be used to select the node and specific subaddressing could be used to alert circuitry within the node, it being understood that each node could contain a variety of circuitry for performing different functions. Referring to FIG. 3, a tone $f_1$ could be used to alert node 58 where a subaddress identifying the loop-back circuitry 56 within node 58 is used to instigate a loop-back test as previously described. It will be appreciated that the tone/subaddressing address system described in reference to FIG. 3 and with specific respect to the loop-back test system of the invention also could be used to alert and control circuitry in a TIU for functions other than for providing a loop-back test.

To perform the loop-back of the data message to processor 45, loop-back devices 46a through 46g are located at points along the local loop 12 to isolate critical elements in the system. While the loop-back devices 46a–46g are illustrated at particular locations in the illustrated embodiment, it will be appreciated that these devices can be located anywhere along the local loop and can be integral to the customer premise equipment because the addressing mechanism described above allows the loop-back devices to be uniquely addressed.

Each loop-back device, upon receipt of a loop test signal from the test unit 40 that is addressed to that device, automatically returns a response signal to the test unit (i.e., loops back the test signal or transmits a different fixed signal). The test unit 40 inspects the response signal and determines if the signal has been mistransmitted in any manner during the transmission, typically by comparing the actual response signal to the desired response signal. If the response signal that is returned to the test unit 40 is different than the desired response signal or if no response signal is returned, the test unit 40 identifies a problem in the local loop between the switching system hosting the local loop and the responding loop-back device. By sequentially addressing the loop-back devices, the test system can identify and isolate problem areas within the network. For example, in the illustrated embodiment, assume the test unit 40 initiates loop-back tests for the loop-back devices 46c, 46f, and 46g located at the distal endpoints of the local loop. If no error was detected as a result of these tests, the test system would "know" that there was no continuity problem along the local loop. The test system would then halt the test and proceed to test another local loop. If an error was detected from one of these tests, the test system would proceed with tests to intermediate loop-back devices. For example, assume that the test to loop-back device 46f resulted in a failure, indicating that the loop segment between the switching system and the loop-back device 46f had a problem. The test unit would then initiate a loop-back test for the loop-back device 46d located at the output port of the TIU 32. If no error was detected as a result of this test, the test unit 40 would know that a problem exists in the segment of the local loop between the loop-back device 46f and the loop-back device 46d located at the output port of TIU 32 (the test system previously having determined that the segment between the switching system and loop-back device 46f had a problem). By properly sequencing through the loop-back devices, the test system can identify problem segments in the local loop. It is to be understood that the more loop-back devices that are provided, the more precisely problem segments can be identified. Moreover, while the illustrated embodiment shows one preferred arrangement of the loop-back devices, it is to be understood that loop-back devices can be provided anywhere along the local loop.

Figure 2:
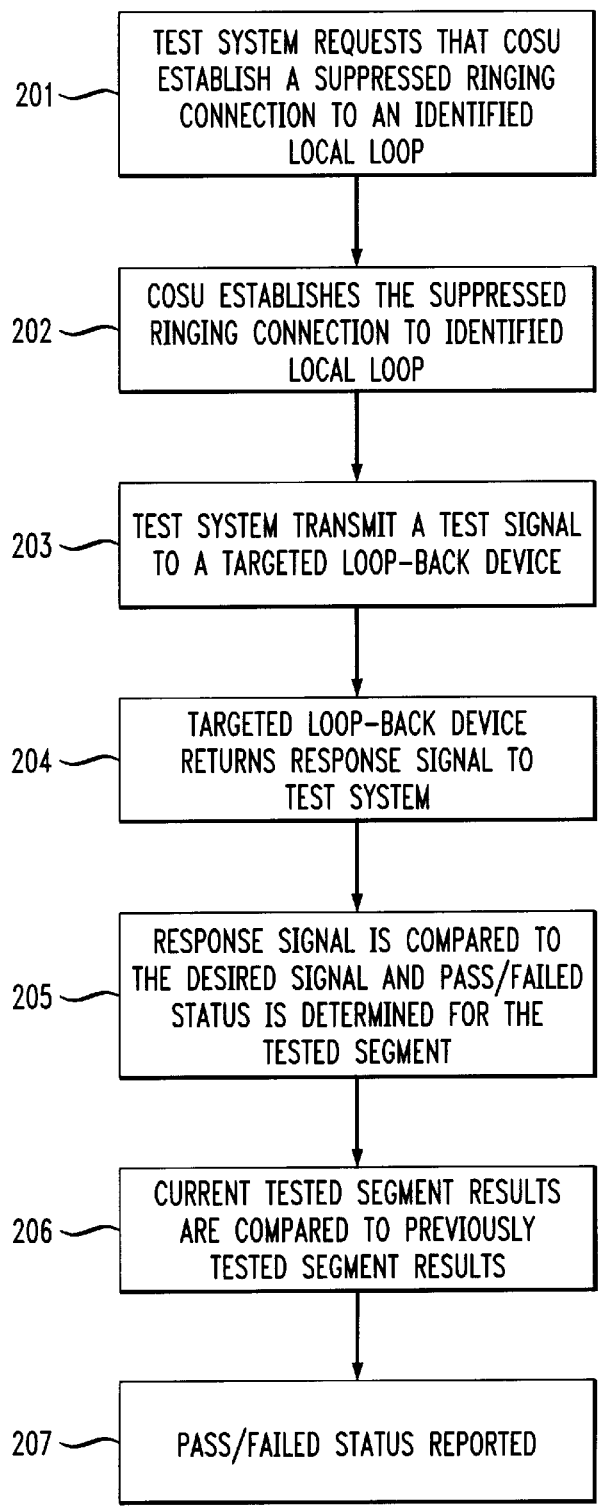
FIG. 2 is a flow chart describing the method of operation of the system of the invention.

Operation of test system of the invention will be described with specific reference to FIG. 2. To begin operation of a test sequence, test unit 40, either automatically or at the request of a craft, sends a message to the COSU 36 requesting that the COSU create a suppressed ringing connection to a local loop to be tested as identified by a directory number, circuit identification, CPE identification or the like (block 201). As previously described, test unit 40 can either be connected to COSU 36 over a dedicated line or the connection can be made over a dial up line through the switch fabric of switching system 2. The COSU 36 performs a security analysis to determine if the test system has the authority to create the connection and sets up the suppressed ringing connection over a UTT 38 to the identified CPE as is known in the art (block 202). Once the connection is established, test unit 40 transmits a loop-back test signal including a preamble having the address of a targeted loop-back device and a predetermined data message (block 203). For purposes of explanation, assume the preamble targets loop-back device 46f.

The loop-back test signal is routed to local loop 12 containing the targeted loop-back device 46f via the COSU 36, UTT 38 and call processing switch fabric of switching system 2. When loop-back device 46f receives the loop-back test signal, including the preamble identifying it as the targeted loop-back device, it returns the response data message to processor 45 over the same connection as the original test signal (block 204). The processor 45, upon receipt of the response signal, compares the response message to the desired response message (block 205). If the response message corresponds to the desired message, the test unit 40 identifies the segment of the local loop between switching system 2 and loop-back device 46f as passing the loop-back test, but if the response data message is not the desired data message, test unit 40 identifies this segment of the local loop as failing the loop-back test (block 205). The pass/fail status of each segment is stored in memory 44 until the test of the local loop is completed.

Upon receipt of the looped-back response signal from loop-back device 46f, the test unit 40 transmits a second test signal having a preamble identifying the loop-back device 46g as the targeted device (block 203). Upon receipt of this signal, the loop-back device 46g automatically returns the data message to test unit 40 (block 204). Processor 45 compares the response signal to the desired response signal to determine if the messages are the same (block 205). If the messages are the same, test unit 40 identifies the segment of the local loop between switching system 2 and loop-back devices 46g as passing the loop-back test and if the messages are not the same, the test unit 40 identifies the segment of the local loop between the switching system 2 and the loop-back device 46g as failing the loop-back test. The processor 45 then compares the results of the individual tests for loop-back devices to identify and isolate the problem segment (block 206). For example, assuming that the test to loop-back device 46f passed and that the test to loop-back device 46g failed, processor 45 can logically identify the segment of the local loop containing the problem by comparing the results of the two tests. In the instant example, the segment of the local loop between loop-back device 46g and loop-back device 46b is determined as containing the problem because it was determined that the segment of the local loop from the switching system 2 to loop-back device 46f did not have a problem but the segment of the local loop between switching system 2 and loop-back device 46g did have a problem such that the problem must exist in that segment of the local loop (i.e. between loop-back devices 46b and 46g) not common to the two tests. An appropriate pass/fail message is displayed to the craft for each segment of the loop that is tested or maintenance responses are prepared automatically (block 207). Test unit 40 continues this sequence of tests for each of the loop-back devices until the status of the entire local loop has been determined.

It should be noted that while in the illustrated embodiment the loop-back tests are conducted in sequence from the most distal point to the most proximate point on the local loop, the processor could test the points in any sequence, store the results of all of the tests and logically determine if any segments of the local loop failed the test. The system can also selectively test segments for selected ones, but not all, of the loop-back devices, if desired.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A test apparatus for use in a public switched network, comprising:
   a switching system having a switch fabric for switching voice and data;
   a plurality of local loops connected to said switching system, said switching system selectively routing calls to said plurality of local loops;
   a test unit, connected to said switching system, for determining if a problem exists in a one of said plurality of local loops;
   means, connected to said switching system, for establishing a suppressed ringing connection through said switch fabric to one of said plurality of local loops;
   means, responsive to said switching system establishing a connection from said test unit to said means for establishing a suppressed ringing connection, for interconnecting said test unit to a selected one of said plurality of local loops;
   means, located in said test unit for transmitting a test signal to said selected one of said plurality of local loops via said means for establishing a suppressed ringing connection; and
   means, located in said test unit, for determining if a problem exists in said local loop based on a response signal returned from said selected one of said plurality of local loops in response to said test signal.

2. The test apparatus according to claim 1, wherein said selected one of said plurality of local loops includes a telemetry interface unit interfacing with at least one utility meter.

3. The test apparatus according to claim 1, wherein said selected one of said plurality of local loops includes a loop-back capability where said response signal is said test signal.

4. The test apparatus according to claim 1, wherein said selected one of said plurality of local loops includes a transponder where a predetermined response signal is transmitted from said transponder in response to receipt of said test signal.

5. The test apparatus according to claim 3, wherein said selected one of said plurality of local loops includes a plurality of loop-back devices located at various positions along said selected one of said plurality of local loops.

6. The test apparatus according to claim 4, wherein said selected one of said plurality of local loops includes a plurality of transponders located at various positions along said selected one of said plurality of local loops.

7. The test apparatus according to claim 5, wherein said test signal includes means for targeting one of said plurality of loop-back devices whereby a segment along said selected one of said plurality of local loops between said one of said plurality of loop-back devices and said switching system is tested.

8. The test apparatus according to claim 6, wherein said test signal includes means for targeting one of said plurality of transponders whereby said one of said plurality of transponders is tested.

9. The test apparatus according to claim 1, wherein the means for determining includes means for comparing said test signal to said response signal.

10. The test apparatus according to claim 1, wherein said means for establishing a suppressed ringing connection establishes suppressed ringing connections to a plurality of local loops such that said test unit performs a plurality of tests simultaneously.

11. The test apparatus according to claim 1, wherein said means for establishing a suppressed ringing connection includes a central office service unit connected to said switching system over a plurality of standard voice trunks.

12. The test apparatus according to claim 8, wherein said means for targeting includes means for generating a distinctive tone, said distinctive tone alerting one of means for targeting one of said plurality of loop-back devices.

13. The test apparatus according to claim 12, wherein said one of said plurality of loop-back devices is located in a means for interfacing between said switching system and said selected one of said plurality of local loops.

14. The test apparatus according to claim 13, wherein said one of said plurality of loop-back devices is located in a node in said telemetry interface unit, said distinctive tone alerting said node and a subaddress identifying said one of said plurality of loop-back devices.

15. A method for testing the local loops in a public switched network, having a switching system including a switch fabric and a plurality of local loops connected to the switching system, said plurality of local loops including customer premise equipment, comprising the steps of:
   establishing a suppressed ringing connection between a test unit that is connected to said switching system, and one of said plurality of local loops through said switch fabric;
   generating a test signal at said test unit after the establishment of said suppressed ringing connection;
   transmitting said test signal to said one of said plurality of local loops over said suppressed ringing connection;
   returning a response signal to said test unit from a point in said one of said plurality of local loops in response to said test signal; and
   determining if said one of said plurality of local loops has a problem based on said response signal returned to said test unit over said suppressed ringing connection.

16. The method of claim 15, wherein said step of returning a response signal includes the step of looping back said test signal.

17. The method of claim 15, wherein said step of returning a response signal includes the step of generating the response signal at said point in the local loop.

18. The method of claim 15, wherein said step of determining includes the step of comparing the response signal to a desired response signal.

19. The method of claim 15, wherein the step of determining includes the step of returning the plurality of test signals and comparing the results of the plurality of test signals.

20. A test apparatus for use in a public switched network including a switching system having a switch fabric for switching voice and data and a plurality of local loops connected to said switching system, said plurality of local loops including customer premise equipment, comprising:
   a test unit, connected to said switching system, for determining if a problem exists in a one of said plurality of local loops;
   means, connected to said switching system, for establishing a suppressed ringing connection through said switch fabric to one of said plurality of local loops;
   means, responsive to said switching system establishing a connection from said test unit to said means for establishing a suppressed ringing connection, for interconnecting said test unit to a selected one of said plurality of local loops;

means, located in said test unit for transmitting a test signal to said selected one of said plurality of local loops via said means for establishing a suppressed ringing connection;

first and second means, located in said selected one of said plurality of local loops, for returning a response signal to said test unit upon receipt of said test signal; and means, located in said test unit, for determining if a problem exists in a first segment of said selected one of said plurality of local loops between the switching system and the first means for returning, in a second segment of said selected one of said plurality of local loops between the second means for returning and the switching system and in a third segment of said selected one of said plurality of local loops between the first and second means for returning.

21. The test apparatus of claim 20, further including means for displaying the status of said first, second and third segments in response to said means for determining.

22. The test apparatus of claim 20, wherein the test signal includes means for identifying one of said first or second means for returning for receiving said test signal.

23. The test apparatus of claim 20, further including additional means for returning a response signal to said test unit upon receipt of said test signal in the local loop.

24. A method for testing the local loop in a public switched network, having a switching system including a switch fabric and a plurality of local loops connected to the switching system, said plurality of local loops including customer premise equipment, comprising the steps of:

establishing a suppressed ringing connection between a test unit that is connected to said switching system, and one of said plurality of local loops through said switch fabric;

generating a test signal at said test unit;

transmitting said test signal over said suppressed ringing connection between said test unit and said one of said plurality of local loops;

returning a response signal to said test unit from a plurality of points in said one of said plurality of local loops in response to said test signal;

determining if a problem exists in said local loop between said switching system and any one of said plurality of points based on a comparison of said test signal to said response signal; and determining if a problem exists in said local loop between any two of said plurality of points based on said response signal returned to said test unit.

25. The method of claim 24, wherein the step of determining if a problem exists in the local loop between any two of said plurality of points includes the step of comparing the test results for said any two of said plurality of points.

26. A method for use in a public switched network for alerting circuitry in a local loop having a telemetry interface unit including a switching system and a plurality of local loops connected to the switching system, comprising the steps of:

establishing a suppressed ringing connection between a unit remote from the switching system and one of said plurality of local loops;

providing a plurality of distinctive tones for transmission over said suppressed ringing connection;

alerting specific circuitry within the telemetry interface unit based on a first specific one of said plurality of distinctive tones and alerting other specific circuitry within said telemetry interface unit based on a second different specific one of said tones; and transmitting one of said specific tones to said circuitry to control the functionality of the telemetry interface unit.

27. The method of claim 26, wherein a subaddress is associated with said tones to further address circuitry in said telemetry interface unit.

* * * * *